United States Patent [19]
Melby

[11] 3,896,775
[45] July 29, 1975

[54] SUPERCHARGED SIX-STROKE CYCLE COMBUSTION ENGINE

[76] Inventor: Raymond C. Melby, Box 395, Hinsdale, Mont. 59241

[22] Filed: Aug. 21, 1974

[21] Appl. No.: 499,350

[52] U.S. Cl. .............................. 123/64; 123/119 C
[51] Int. Cl.² ........................................ F02B 75/02
[58] Field of Search ...................... 123/64, 119 C

[56] References Cited
UNITED STATES PATENTS

| | | | |
|---|---|---|---|
| 1,771,335 | 7/1930 | Karpes | 123/64 |
| 1,882,971 | 10/1932 | Schimanek | 123/64 |
| 1,884,077 | 10/1932 | Michlun | 123/64 |
| 2,295,619 | 9/1942 | Wydler | 123/64 |
| 2,355,806 | 8/1944 | Kroyer | 123/64 |
| 2,849,992 | 9/1958 | Stillebroer et al. | 123/119 C X |
| 2,941,522 | 6/1960 | Sagona | 123/64 |
| 3,010,312 | 11/1961 | Jezl | 123/64 X |
| 3,662,543 | 5/1972 | Milisavljevic | 123/64 X |
| 3,709,201 | 1/1973 | Cook | 123/64 |

*Primary Examiner*—Charles J. Myhre
*Assistant Examiner*—William C. Anderson
*Attorney, Agent, or Firm*—Clarence A. O'Brien; Harvey B. Jacobson

[57] ABSTRACT

A multi-cylinder reciprocating piston internal combustion engine is provided including a combustion chamber for each cylinder and two pairs of cam shaft actuated intake and exhaust valves control the flow of gases into and out of each combustion chamber. Fresh air is first inducted from a fresh air intake through a first intake valve, compressed and then exhausted through a first exhaust valve into a carburetted second intake in a manner to at least somewhat pressurize the downstream end of the carburetted intake from which air and fuel is then inducted through the second intake valve. The air and fuel mixture is then compressed and ignited in the combustion chamber and thereafter exhausted through the second exhaust valve.

8 Claims, 7 Drawing Figures

SUPERCHARGED SIX-STROKE CYCLE COMBUSTION ENGINE

BACKGROUND OF THE INVENTION smooth

Various forms of reciprocating piston internal combustion engines utilizing more than four cycles of a piston per power stroke thereof have been heretofore designed. Examples of such previously designed engines may be found in U.S. Pat. Nos: 1,771,335, 1,882,971, 2,209,706, 2,355,806, 2,941,522, 3,010,312, 3,662,543 and 3,709,201.

However, these previously designed engines have not been constructed in a manner whereby the extra stroke or strokes thereof have been capable of causing the air and fuel inducted into a cylinder or combustion chamber on the primary intake stroke to be supercharged whereby the air and fuel inducted during the primary intake stroke may thereafter be more highly compressed during the compression stroke immediately prior to the subsequent power stroke.

BRIEF DESCRIPTION OF THE INVENTION

The reciprocating piston combustion engine of the instant invention utilizes additional intake and exhaust strokes for fresh air between the main exhaust stroke for exhausting the byproducts of combustion and the primary intake stroke for intaking a combustible mixture of air and fuel into the combustion chamber. The supplemental air and exhaust strokes result in fresh air being drawn into the cylinder and immediately thereafter exhausted from the cylinder into a cool exhaust manifold and thereafter into a pair of transfer pipes each including a jet-type outlet. These jet-type outlets tend to maintain the fresh air exhausted from the cylinder within the transfer pipes under pressure and the jet-type outlets open into the primary air and fuel induction passages at the intake of the carburetor in a downstream direction and into the primary intake manifold in a downstream direction immediately downstream from the carburetor. These jet-type discharges of fresh air obviously supplement the air inducted through the primary air fuel intake passages by an amount equal to the volume of air discharged from the jet-type outlets and further, by venturi action, cause additional fresh air to be inducted through the primary air and fuel intake passages. Thus, the total volume of fuel inducted into the combustion chamber during the primary induction stroke of the piston is under superatomospheric pressure as opposed to subatmospheric pressure and is therefore considered to be "supercharged". Of course, after the primary induction stroke, all valves of the cylinder are closed and the next upward movement of the piston compresses the supercharged air and fuel mixture within the cylinder immediately prior to the next downward or power stroke of the piston, the combustible mixture of air and fuel within the cylinder being ignited immediately prior to the power stroke of the piston by any suitable ignition means.

The main object of this invention is to provide a reciprocating combustion engine constructed in a manner whereby the primary air and fuel mixture inducted thereinto will be supercharged and with the supercharging function of the engine performed by each of the reciprocating pistons thereof.

Another object of this invention, in accordance with the immediately preceding object, is to provide a combustion engine which will operate under the supercharged principle and which therefore will produce low objectionable exhaust emissions.

Yet another object of this invention is to provide a six stroke cycle reciprocating piston engine constructed in a manner whereby the primary air and fuel mixture inducted thereinto will be subject to considerable turbulence of supercharged heated fresh air and which will thus experience an air and fuel charge containing a far greater percentage of fully vaporized fuel.

Another important object of this invention is to provide a six stroke cycle reciprocating piston combustion engine utilizing six cylinders which fire on even intervals.

A final object of this invention to be specifically enumerated herein is to provide a new form of six stroke cycle reciprocating piston internal combustion engine which will conform to conventional forms of manufacture, be of simple construction and smooth in operation so as to provide a device that will be economically feasible, long lasting and substantially vibrationless.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 1:
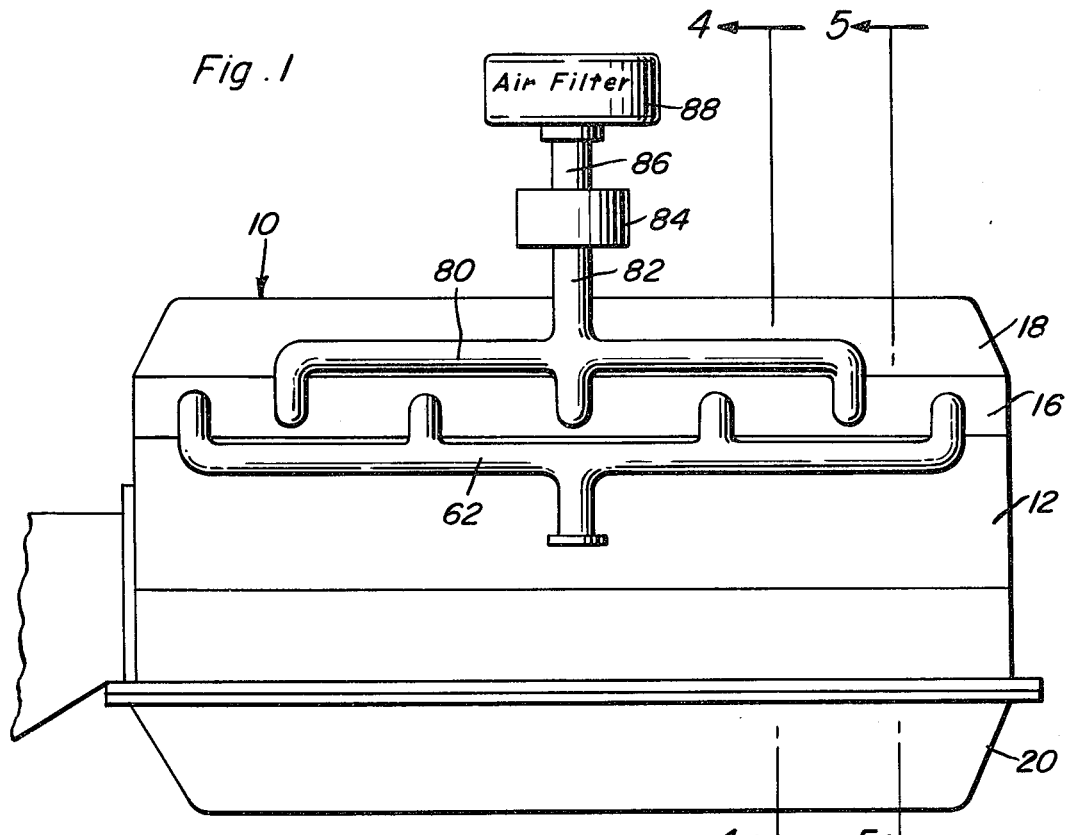
FIG. 1 is a side elevational view of a reciprocating piston internal combustion engine constructed in accordance with the present invention.

Referring now more specifically to the drawings, the numeral 10 generally designates a combustion engine of the reciprocating piston type constructed in accordance with the present invention.

The engine 10 includes an engine block 12 having six cylinder bores 14 formed therein and a cylinder head 16 is mounted atop the block 12 in any convenient manner and has a rack or cover 18 secured thereover. Further, the lower end of the block 12 is closed by means of a crank case pan 20 of conventional design.

A crank shaft 22 is journaled from the lower portion of the block 12 and includes a plurality of crank throws 24, 26, 28, 30, 32, and 34 comprising the throws for cylinders Nos. 1, 2, 3, 4, 5 and 6, respectively. Cylinders 1 through 6 comprise those cylinders 14 counted consecutively from the right side of FIG. 2 to the left side of FIG. 2. The throws 24 and 34 are longitudinally aligned, the throws 28 and 30 are longitudinally aligned and the throws 26 and 32 are longitudinally aligned.

Figure 2:
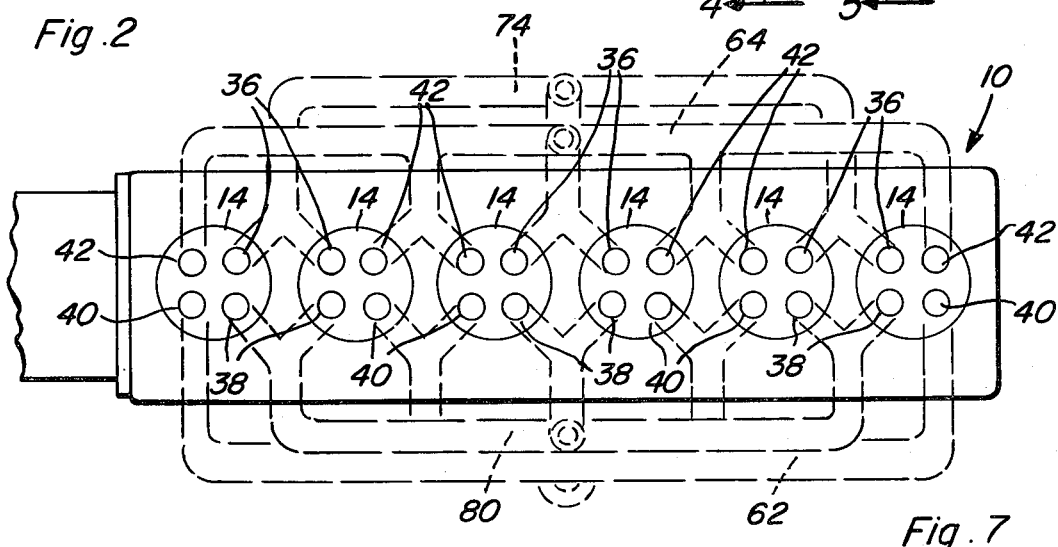
FIG. 2 is a schematic top plan view of the engine illustrating the various intake and exhaust passages as well as the two intake and two exhaust valves for each of the six cylinders of the engine.
Figures 6, 7:
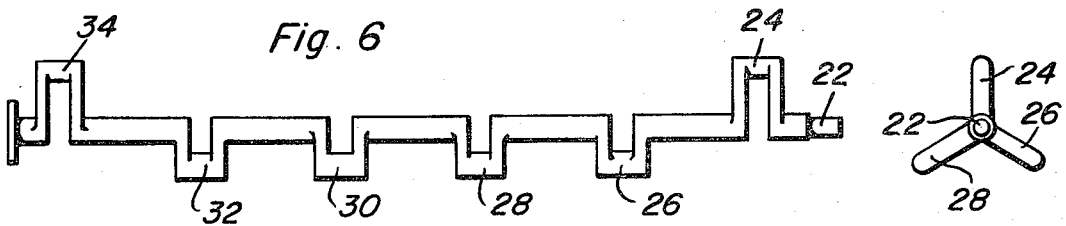
FIG. 6 is a side elevational view of the crank shaft utilized in the engine illustrated in FIGS. 1 through 5.
FIG. 7 is an end elevational view of the crank shaft as seen from the right side of FIG. 6.
Figure 3:
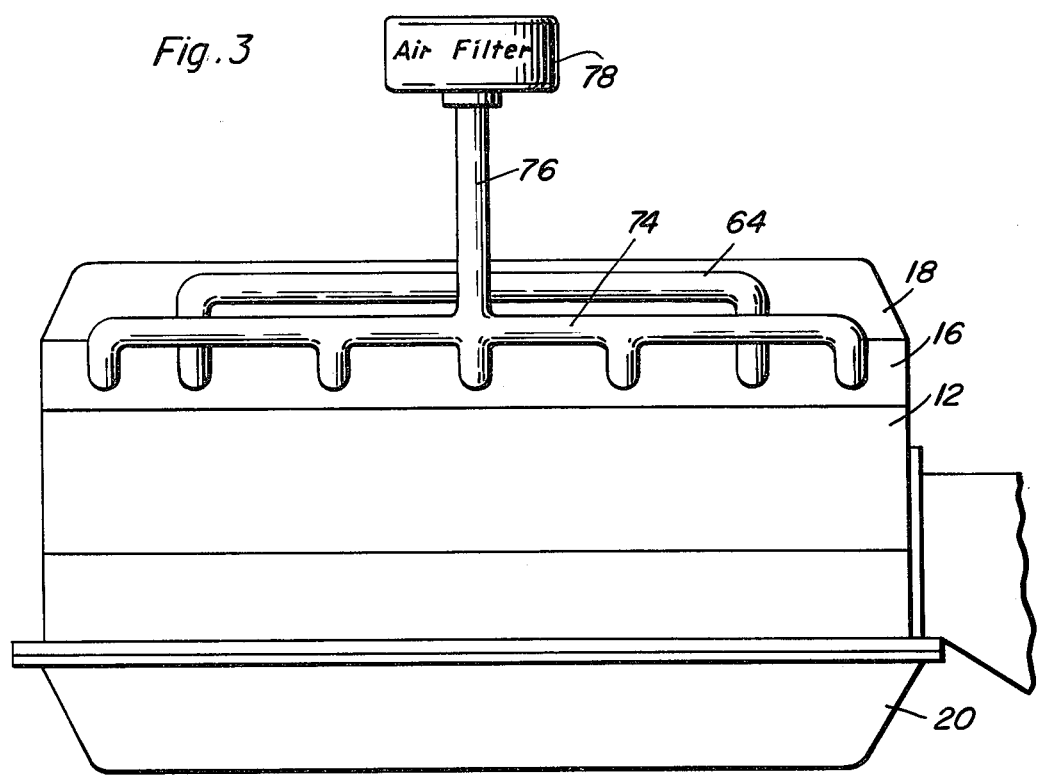
FIG. 3 is a second side elevational view of the engine as seen from the rear of FIG. 1.
Figure 4:
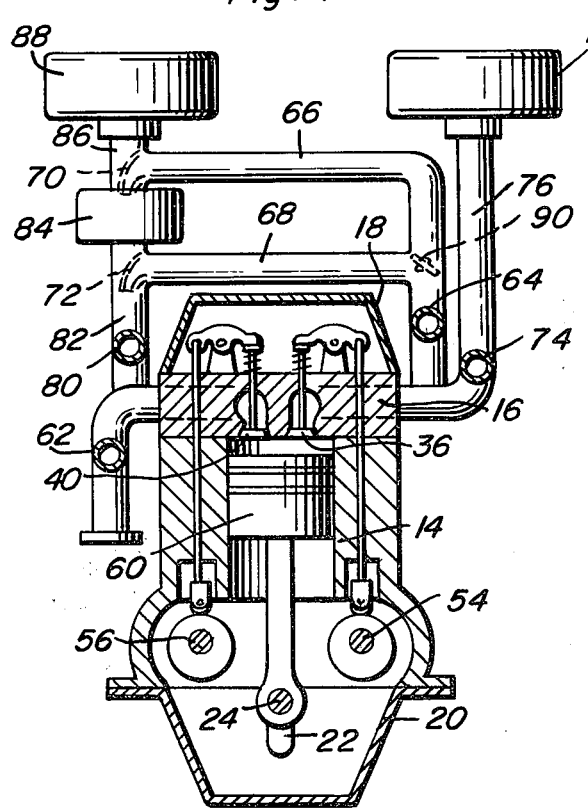
FIG. 4 is transverse vertical sectional view taken substantially upon the plane indicated by the section line 4—4 of FIG. 1.
Figure 5:
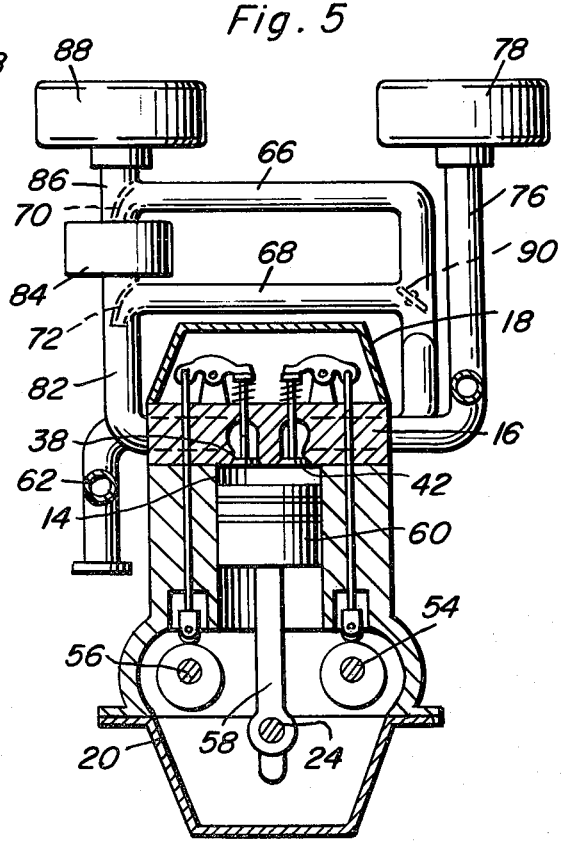
FIG. 5 is a transverse sectional view taken substantially upon the plane indicated by the section line 5—5 of FIG. 1.

From FIG. 2 it may be seen that the head 16 includes first and second intake valves 36 and 38 for each cylinder 14 and first and second exhaust valves 40 and 42 for each cylinder 14. Additionally, the engine 10 includes a pair of cam shafts 54 and 56 suitable driven by any convenient means at one-third the speed of the crank shaft 22 from the latter. Also, each crank shaft throw has a connecting rod 58 journal thereon and the end of each connecting rod 58 remote from the crank shaft has a piston 60 oscillatably mounted thereon and slidably disposed in the corresponding cylinder 14.

The exhaust valves 40 open into exhaust passages provided therefor in the head 16 and which discharge into a primary exhaust manifold 62 while the exhaust valves 42 discharge into cool exhaust passages in the head 16 which open into a cool exhaust manifold 64.

The exhaust manifold 64 opens into a pair of transfer conduits or passages 66 and 68 including jet-type discharge ends 70 and 72 to be hereinafter more fully set fourth. In addition, the engine is provided with a fresh air intake manifold 74 which opens into first intake air passages in the head 12 controlled by the fresh air intake valve 36 and the intake manifold 74 includes a main induction pipe 76 having an air cleaner 78 operatively associated with its inlet end. Still further, the engine 10 includes a primary intake manifold 80 which opens into primary intake air passages formed in head 12 under the control of the intake valve 38 and the intake manifold 80 includes a main induction pipe 82 having a carburetor 84 operatively associated therewith including an inlet 86 having a second air cleaner 88 mounted thereon.

The discharge nozzles or outlets 70 and 72 open in a downstream direction within the carburetor inlet 86 and within the main induction pipe 82 of the intake manifold 80 immediately downstream from the carburetor 84 and the cool exhaust manifold includes a manually operable valve 90, which valve 90 may be also automatically actuated by any suitable operator (not shown), to open or close off the transfer pipe 66 to the flow of fresh exhausted air therethrough toward the carburetor 84.

The engine 10 may be provided with any suitable ignition means for igniting compressed air and fuel charges within the upper ends of the cylinders 14. Such conventional means being not illustrated or specifically described herein for the purpose of more fully disclosing the novel structure rather than conventional structure of the engine 10. Further, it is to be understood that the firing order of the engine 10 will be 1, 5, 3, 6, 2, 4, with the cylinders 14 numbered consecutively from front to rear.

In operation, and considering the operation of only one of the cylinders 14, on the initial downward power stroke of the piston 60, all valves 36, 38, 40 and 42 of the cylinder 14 are closed. Then, upon the subsequent upward movement of the piston 60, the primary exhaust valve 40 is opened by the associated cam shaft and valve train thereby enabling the byproducts of combustion to be exhausted from the engine 10 into the primary exhaust manifold 62 for discharge into a conventional muffler system (not shown). Then, as the piston 60 reaches the uppermost point of travel in the cylinder 14, the exhaust valve 40 closes and the fresh air intake valve 36 opens and fresh air is inducted into the cylinder 14 during the next or second downward stroke of the piston 60. At the completion of the second downward stroke of the piston 60, the intake valve 36 is closed and the exhaust valve 42 is opened whereby the fresh air inducted into the cylinder 14 is exhausted therefrom into the cool manifold 64 and the transfer pipes 66 and 68. Of course, because of the restricted discharge nozzles 70 and 72, the fresh air exhausted into the cool exhaust manifold 64 is at least momentarily maintained under pressure. After the exhaust valve 42 has been closed and during the next downward stroke of the piston 60, the intake valve 38 is opened whereby fresh air is inducted through the air cleaner 88, the carburetor 84 and into the intake manifold 80 and from the latter through the valves 38 and into the cylinders 14. However, the previous fresh air discharged into the cool exhaust manifold 64 and the transfer pipes 66 and 68 is discharged from the jet discharge nozzles 70 and 72 during the induction of fresh air through the carburetor 84 and into the intake manifold 80 and thus supplements the normal inducted air and fuel. In addition, the jet discharges of fresh air into the inlet 86 of the carburetor 84 from the nozzle 70 causes, by venturi action, additional amounts of air to be inducted through the carburetor and the jet discharge of fresh air from the discharge nozzle 72 into the induction pipe 82 causes still further air to be inducted into the manifold 80 and cylinder 14 by venturi action. Then, as the piston 60 reaches the bottom of its third downward stroke, the exhaust valve 38 is closed and the total inducted air and fuel mixture within the cylinder 14 is compressed during the third upward movement of the piston 60 while all of the valves 36, 38, 40 and 42 remain closed. Then, as the piston 60 reaches the uppermost point of travel during its third upward stroke, the aforementioned ignition means (not shown) ignites the compressed air and fuel charge within the cylinder 14 and causes the piston 60 to be driven downwardly on the second power stroke thereof.

The valve 90 may be operatively associated with the throttle control (not shown) of the engine 10 and with a pressure sensing mechanism (not shown) in order to close the transfer pipe 66 to the passage of fresh air thereinto from the cool exhaust manifold 64 whereby substantially all of the cool fresh air exhausted from the engine during the second upward stroke of the piston will be caused to enter the induction pipe 72 below the carburetor 84 thereby result in a considerably leaner mixture during closed throttle and higher manifold pressure operating conditions.

Inasmuch as the engine 10 operates in the manner of a supercharged engine, the undesirable exhaust emissions are greatly reduced. Further, inasmuch as the air and fuel charge inducted into the intake manifold 80 is successively subject to jet discharges of heated fresh air, the air and fuel mixture is more uniform and the fuel component thereof is more completely vaporized. These conditions further enhance the reduction of objectionable exhaust emissions.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with an engine including a cylinder, a piston reciprocal in said cylinder, primary induction passage means including charge forming means operative to admit measured quantities of liquid fuel with air inducted through said primary induction passage means, primary exhaust passage means, secondary air induction passage means and secondary exhaust passage means, said engine further including means operative to (1) seal said cylinder from all of said passage means during a first stroke of said engine, (2) communicate said cylinder with said primary exhaust passage means during the second stroke of said piston, (3) communicate said cylinder with said secondary induction passage means during the third stroke of said piston, (4) communicate said cylinder with said secondary exhaust passage means during the fourth stroke of said piston, (5) communicate said cylinder with said primary induction passage means during the fifth stroke of said piston and (6) seal said cylinder from all of said passage means during the sixth stroke of said piston, said secondary exhaust passage means including jet-type outlet means therefor opening into said primary induction passage means in a downstream direction.

2. The combination of claim 1 wherein said charge forming means includes an induction air inlet portion and said jet-type outlet means includes at least one jet outlet opening into said induction air inlet portion.

3. The combination of claim 2 wherein said jet-type outlet means also includes a second jet outlet opening into said primary induction passage means downstream from said charge forming means.

4. The combination of claim 3 wherein said secondary exhaust passage means includes means operative to at least substantially block all flow of air entering said secondary exhaust passage means from said cylinder to said one jet outlet.

5. The combination of claim 1 wherein said charge forming means comprises a carburetor.

6. The combination of claim 1 whereais said means (1) (3), (4) and (5) include separately operable valves in operative association with said cylinder.

7. The combination of claim 6 wherein said engine includes a cylinder head closing one end of said cylinder from which all of said valves are shiftably supported.

8. The combination of claim 7 wherein said valves comprise poppet valves.

* * * * *